(12) United States Patent
Cote (10) Patent No.: US 10,649,821 B2
(45) Date of Patent: May 12, 2020

(54) METHOD, SYSTEM AND APPARATUS FOR DYNAMICALLY ALLOCATING EVENT DATA

(71) Applicant: Zebra Technologies Corporation, Lincolnshire, IL (US)

(72) Inventor: Michael P. Cote, Princeton, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/988,341

(22) Filed: May 24, 2018

(65) Prior Publication Data
US 2019/0361755 A1 Nov. 28, 2019

(51) Int. Cl.
*G06F 9/54* (2006.01)
*G06F 9/50* (2006.01)
*G06F 16/27* (2019.01)

(52) U.S. Cl.
CPC .......... *G06F 9/542* (2013.01); *G06F 9/5061* (2013.01); *G06F 9/544* (2013.01); *G06F 16/278* (2019.01)

(58) Field of Classification Search
CPC ...................................................... G06F 9/542
USPC ...................................................... 719/318
See application file for complete search history.

(56) References Cited

U.S. PATENT DOCUMENTS

| 8,060,792 | B2 * | 11/2011 | Sivasubramanian | ....................... G06F 9/5061 714/47.1 |
| 9,128,899 | B1 * | 9/2015 | McAlister | ............. G06F 11/203 |
| 9,906,589 | B2 * | 2/2018 | Kathuria | ............. H04L 67/1008 |
| 9,917,777 | B2 * | 3/2018 | Buchnik | ................. H04L 47/10 |
| 10,025,645 | B1 * | 7/2018 | Bastian | ................... G06F 9/542 |
| 2018/0349419 | A1 * | 12/2018 | Annamalai | ........... G06F 16/214 |

* cited by examiner

*Primary Examiner* — Andy Ho
(74) *Attorney, Agent, or Firm* — Yuri Astvatsaturov (57) ABSTRACT

A method of dynamically allocating event data from a plurality of client devices among a set of event processors includes: at a partitioning controller, storing an initial shard map allocating initial subsets of the client devices to respective data stores, each data store associated with a respective one of the event processors; at the partitioning controller, obtaining an operational parameter for each of the event processors; at the partitioning controller, generating an updated shard map based on the operational parameter for each of the event processors, the updated map allocating updated subsets of the client devices to the respective data stores; responsive to generating the updated shard map, transmitting a map update notification from the partitioning controller for the client devices.

16 Claims, 6 Drawing Sheets

METHOD, SYSTEM AND APPARATUS FOR DYNAMICALLY ALLOCATING EVENT DATA

BACKGROUND

Computing systems employed to process data from various sources (e.g. mobile devices and the like) may implement a plurality of distinct workers (e.g. distinct hardware nodes, distinct software processes at a given hardware node, or a combination thereof) for handling the incoming data. Such systems may be subject to conflicting design requirements. A first example design requirement is that the incoming data from a given source be processed by the system in the order the data was received from the source. This requirement may be satisfied by consistently assigning data from each source to a particular processor. A second example design requirement is that the workload of the system be balanced among the processors, for example in response to changing activity levels among the sources. This requirement may be satisfied by assigning data from each source to different processors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamically allocating event data from a plurality of client devices among a set of event processors, the method comprising: at a partitioning controller, storing an initial shard map allocating initial subsets of the client devices to respective data stores, each data store associated with a respective one of the event processors; at the partitioning controller, obtaining an operational parameter for each of the event processors; at the partitioning controller, generating an updated shard map based on the operational parameter for each of the event processors, the updated map allocating updated subsets of the client devices to the respective data stores; responsive to generating the updated shard map, transmitting a map update notification from the partitioning controller for the client devices.

Additional examples disclosed herein are directed to a system for dynamically allocating event data from a plurality of client devices among a set of event processors, the system comprising: a partitioning controller including (i) a communications interface, (ii) a memory storing an initial shard map allocating initial subsets of the client devices to respective data stores, each data store associated with a respective one of the event processors, and (iii) a processor connected with the communications interface and the memory, the processor configured to: obtain an operational parameter for each of the event processors; generate an updated shard map based on the operational parameter for each of the event processors, the updated map allocating updated subsets of the client devices to the respective data stores; and responsive to generating the updated shard map, transmit a map update notification for the client devices via the communications interface.

Further examples disclosed herein are directed to a non-transitory computer-readable medium storing a plurality of executable instructions executable by a processor of a partitioning controller, the instructions comprising: storing an initial shard map allocating initial subsets of the client devices to respective data stores, each data store associated with a respective one of the event processors; obtaining an operational parameter for each of the event processors; generating an updated shard map based on the operational parameter for each of the event processors, the updated map allocating updated subsets of the client devices to the respective data stores; and responsive to generating the updated shard map, transmitting a map update notification from the partitioning controller for the client devices.

Figure 1:
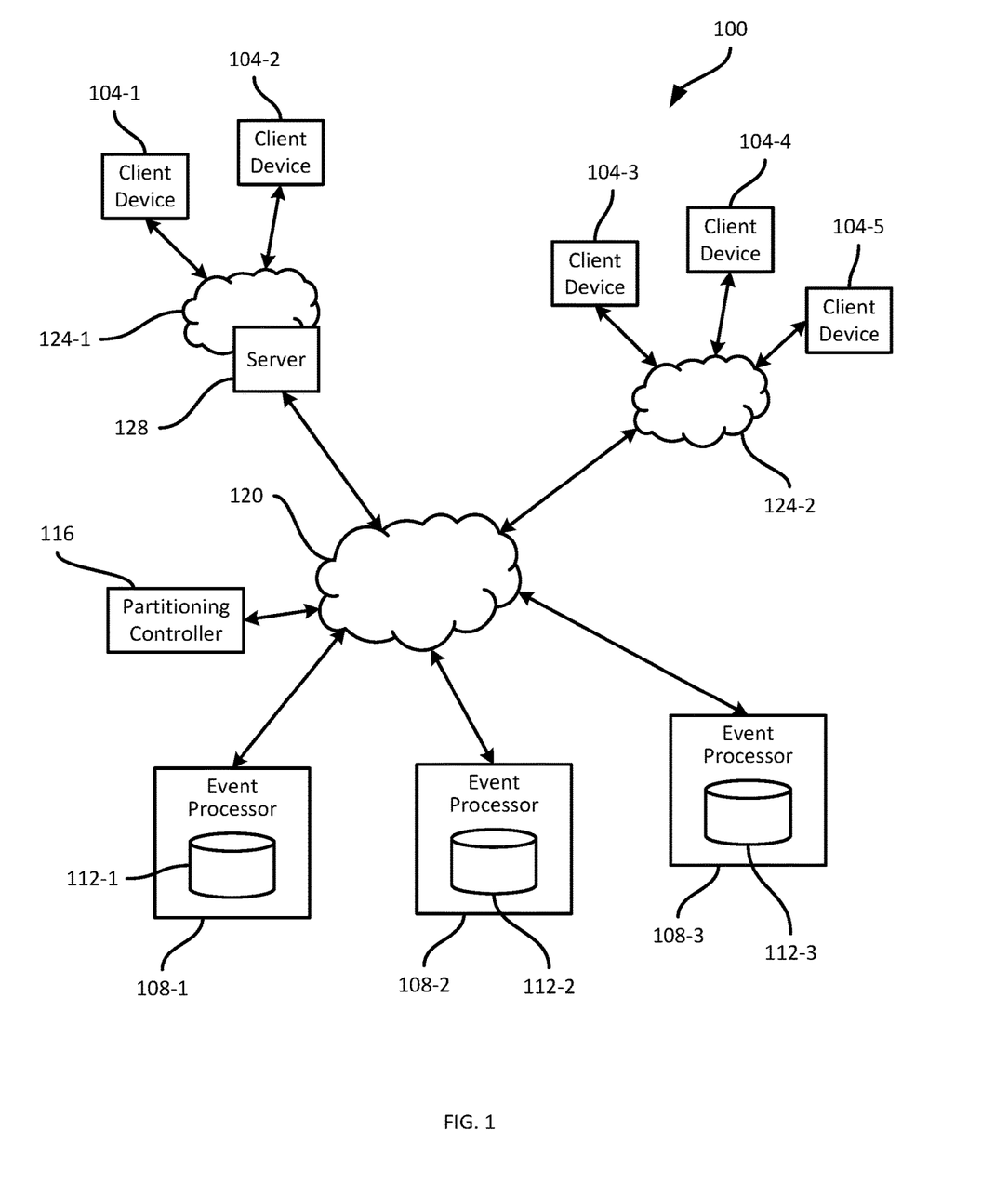
FIG. 1 depicts a communication system for dynamically allocating event data from client devices to event processors.

FIG. 1 depicts a communications system 100 including a plurality of client devices 104, five examples of which (104-1, 104-2, 104-3, 104-4 and 104-5) are illustrated. The client devices are referred to collectively as the client devices 104, and generically as a client device 104 (similar nomenclature is employed herein for other elements of the system 100). In other embodiments, greater or smaller numbers of client devices 104 may be deployed. The client devices 104 include any of a variety of computing devices, such as handheld devices (e.g. barcode scanners, label printers, smartphones, tablet computers and the like), laptop computers, desktop computers, and peripherals (e.g. printers). Each client device 104 is configured to generate event data and transmit the event data to an event processing subsystem implemented as a plurality of event processors 108, of which three examples 108-1, 108-2 and 108-3 are shown.

The above-mentioned event data includes, in some embodiments, operational data for a given client device 104, such as a battery level, error messages, configuration changes, power cycling (e.g. reboot) times and/or counts, times at which the client device 104 was placed on, or removed from, a charging cradle, and the like. In other embodiments, the event data includes, in addition to or instead of the above-mentioned examples, support or repair tickets associated with a client device 104, and the like.

Thus, the client devices 104 are sources of event data that is transmitted to and processed by the above-mentioned event processing subsystem. The client devices 104 may therefore also be referred to herein as source devices, or simply as sources.

The event processors 108 are illustrated as distinct computing devices in FIG. 1, each storing a respective database 112-1, 112-2, 112-3. Although the event processors 108 will be discussed below as distinct computing devices, it will be apparent to those skilled in the art that the event processors 108 can also, in some embodiments, by implemented as distinct processes (e.g. threads) on a common computing device.

Each event processor 108 is configured to receive event data from a subset of the client devices 104, to process the event data, and to store either or both of the event data itself and the results of such processing in the respective database 112. Various processing activities may be performed by the event processors 108. For example, the event processor 108 can be configured, responsive to receiving a battery level from a client device 104, to retrieve previously-received battery levels from the same client device 104 from the database 112 and to generate a predicted battery replacement time for storage in the database 112 (along with the battery levels).

Each database 112 thus contains either or both of event data and data generated via the processing of the event data, for each of a subset of the client devices 104. As will now be apparent to those skilled in the art, the databases 112 may be referred to as database shards (that is, horizontal partitions of a virtual database containing data for all the client devices 104, with each shard containing data corresponding to only some client devices 104).

The system 100 also includes a partitioning controller 116, which may also referred to as a coordinator 116. The coordinator 116 is illustrated as a computing device distinct from the client devices 104 and the event processors 108 in the embodiment illustrated in FIG. 1, but in other embodiments the coordinator 116 can be implemented as a process executed by one of the event processors 108.

The coordinator 116 maintains and updates a shard map defining which subset of the client devices 104 is allocated to each of the event processors 108 (and thus, to each of the databases 112). The mechanisms by which the shard map is updated by the coordinator 116, and by which such updates are disseminated throughout the system 100, will be described below in greater detail.

The components of the system 100 are connected to a network 120. In the embodiment illustrated in FIG. 1, the network 120 includes a wide-area network such as the Internet, though it will be apparent to those skilled in the art that the network 120 can include other wide-area networks, such as cellular networks and the like. The event processors 108 and the coordinator 116 can be connected to the network 120 via additional networks (not shown), such as local-area networks (LANs) (e.g. the event processors 108 and the coordinator 116 can be connected to one another over one or more LANs, which are in turn connected to the network 120).

The client devices 104 are connected to the network 120, as illustrated in FIG. 1, via local area networks 124-1 and 124-2. In other embodiments, one or more of the client devices 104 can be connected directly to the network 120. In further embodiments, one or more client devices 104 is connected to the above-mentioned local network(s) connecting the event processors 108 to the network 120.

As illustrated in FIG. 1, certain client devices 104 (e.g. devices 104-3, 104-4, 104-5) may be configured to communicate with the event processors 108 and the coordinator 116 directly via the networks 124 and 120. In other words, the client devices 104-3, 104-4 and 104-5 as illustrated in FIG. 1 are configured to transmit event data directly to the event processors 103. Other client devices 104 (e.g. devices 104-1 and 104-2) may be configured to transmit event data to a local server 128 connected to both the network 120 and the network 124-1, which is in turn configured to transmit the event data to the event processors 108.

Before discussing the deployment and updating of the shard map within the system 100, certain subcomponents of the client devices 104, the event processors 108 and the coordinator 116, respectively, will be described in further detail with reference to FIGS. 2A-2C.

Figure 2A:
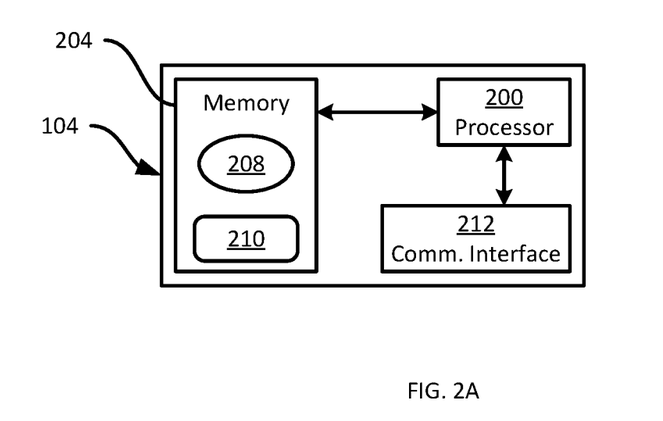
FIGS. 2A, 2B and 2C are block diagrams of certain internal components of the client devices, event processors, and partitioning controller of FIG. 1, respectively.

FIG. 2A illustrates certain internal components of a client device 104. The client device 104 includes a central processing unit (CPU), also referred to as a processor 200, interconnected with a non-transitory computer readable storage medium in the form of a memory 204. The memory 204 includes a suitable combination of volatile memory (e.g. Random Access Memory (RAM)) and non-volatile memory (e.g. magnetic storage, flash memory, and the like). The processor 200 and the memory 204 each comprise one or more integrated circuits (ICs).

The memory 204 stores a plurality of applications, each including a plurality of computer readable instructions executable by the processor 200. The execution of the above-mentioned instructions by the processor 200 causes the client device 104 to implement various functionality, as discussed herein. The applications are therefore said to be configured to perform that functionality in the discussion below. In the present example, the memory 204 stores an event generator application 208, configured to monitor various aspects of the client device 104 and generate event data for transmission to the event processors 108. The application 208 is configured, having generated event data, to transmit the event data to one of the event processors 108 according to a client shard map 210 stored in the memory 204. As will be discussed below, the client map 210 is received at the client device 104 from the coordinator 116, which maintains a central, master version of the map 210.

The client device 104 also includes a communications interface 212, enabling the client device 104 to exchange data with other computing devices over the networks 120 and 124. The communications interface 212 therefore includes any suitable hardware (e.g. transmitters, receivers, network interface controllers and the like) allowing the client device 104 to communicate over the networks 120 and 124.

The client device 104 can also include input devices (not shown) such as any one or more of a touch screen, a keypad, a keyboard, a trigger or other actuator (e.g. the initiate a barcode scanning operation), a microphone and the like, as well as output devices (not shown), such as a speaker, a display and the like.

Figure 2B:
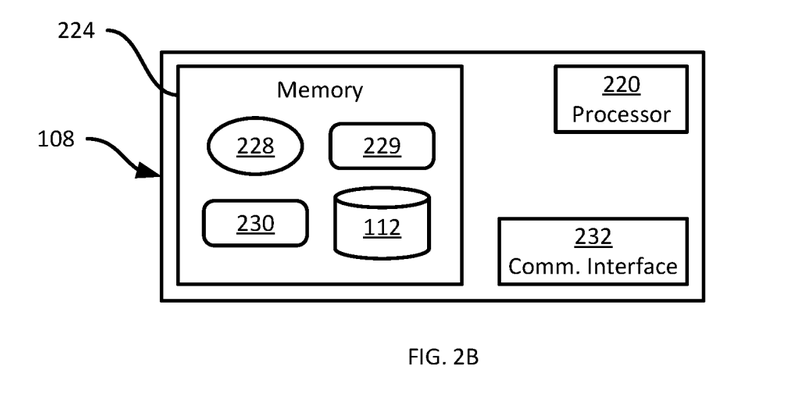

Turning to FIG. 2B, certain components of an event processor 108 are illustrated. The event processor 108 includes a central processing unit (CPU), also referred to as a processor 220, interconnected with a non-transitory computer readable storage medium in the form of a memory 224. The memory 224 includes a suitable combination of volatile memory (e.g. Random Access Memory (RAM)) and non-volatile memory (e.g. magnetic storage, flash memory, and the like). The processor 220 and the memory 224 each comprise one or more integrated circuits (ICs).

The memory 224 stores a plurality of applications, each including a plurality of computer readable instructions executable by the processor 220. The execution of the above-mentioned instructions by the processor 220 causes the event processor 108 to implement various functionality, as discussed herein. The applications are therefore said to be configured to perform that functionality in the discussion below. In the present example, the memory 224 stores an event processor application 228, configured to receive and process event data from the client devices 104. As will be discussed below, the application 228 is also configured to perform certain actions associated with the reallocation of a client device 104 to or from another event processor 108.

The memory 224 also contains the database 112 corresponding to the event processor 108. In other embodiments, the database 112 is stored by one or more distinct computing devices (not shown) accessed by the event processor 108. In addition, the memory 224 includes a queue 229 into which received messages (e.g. containing event data from the client devices 104 or containing reallocation data from client devices 104 and other event processors 108) are placed prior to processing. The queue 229 may be, for example, a reserved portion of the memory 224, and may be managed by the application 228 itself. In general, the queue 229 is employed by the event processor 108 to store received messages in the order in which the messages were received, until the messages can be retrieved and processed via the application 228. In other embodiments, other mechanisms may be employed to maintain the messages in a given order prior to processing, and the queue 229 may be omitted.

The memory 224 also contains a buffer 230. The buffer 230, as will be discussed in greater detail, is employed by the event processor to temporarily store event data pulled from the queue 229 during reallocation of a client device 104. Either or both of the queue 229 and the buffer 230 can be contained in a memory distinct from the memory 224 in other embodiments, such as a memory of a distinct computing device (not shown).

The event processor 108 also includes a communications interface 232, enabling the event processor 108 to exchange data with other computing devices over the networks 120 and 124. The communications interface 232 therefore includes any suitable hardware (e.g. transmitters, receivers, network interface controllers and the like) allowing the event processor 108 to communicate over the networks 120 and 124.

The event processor 108 can also include input devices (not shown) such as any one or more of a touch screen, a keypad, a keyboard, a trigger or other actuator (e.g. the initiate a barcode scanning operation), a microphone and the like, as well as output devices (not shown), such as a speaker, a display and the like.

Figure 2C:
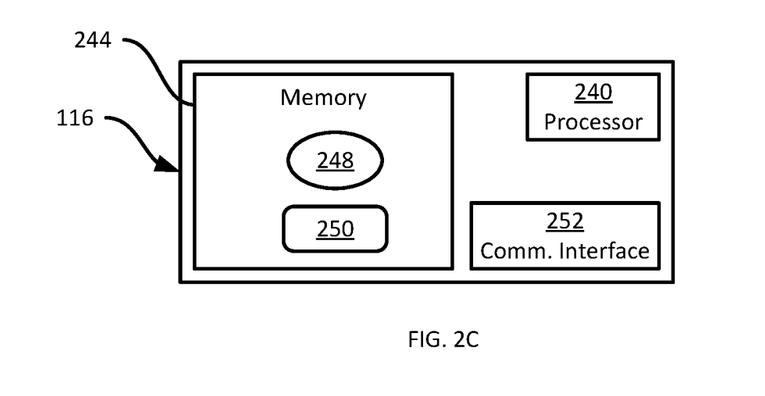

Turning to FIG. 2C, certain components of the partitioning controller 116 (i.e. the coordinator 116) are illustrated. The coordinator 116 includes a central processing unit (CPU), also referred to as a processor 240, interconnected with a non-transitory computer readable storage medium in the form of a memory 244. The memory 244 includes a suitable combination of volatile memory (e.g. Random Access Memory (RAM)) and non-volatile memory (e.g. magnetic storage, flash memory, and the like). The processor 240 and the memory 244 each comprise one or more integrated circuits (ICs).

The memory 244 stores a plurality of applications, each including a plurality of computer readable instructions executable by the processor 240. The execution of the above-mentioned instructions by the processor 240 causes the coordinator 116 to implement various functionality, as discussed herein. The applications are therefore said to be configured to perform that functionality in the discussion below. In the present example, the memory 244 stores shard map generator application 248, configured to maintain and update a master shard map 250 according to which the map 210 at each client device 104 is updated.

The coordinator 116 also includes a communications interface 252, enabling the coordinator 116 to exchange data with other computing devices over the networks 120 and 124. The communications interface 252 therefore includes any suitable hardware (e.g. transmitters, receivers, network interface controllers and the like) allowing the coordinator 116 to communicate over the networks 120 and 124.

The coordinator 116 can also include input devices (not shown) such as any one or more of a touch screen, a keypad, a keyboard, a trigger or other actuator (e.g. the initiate a barcode scanning operation), a microphone and the like, as well as output devices (not shown), such as a speaker, a display and the like.

Figure 3:
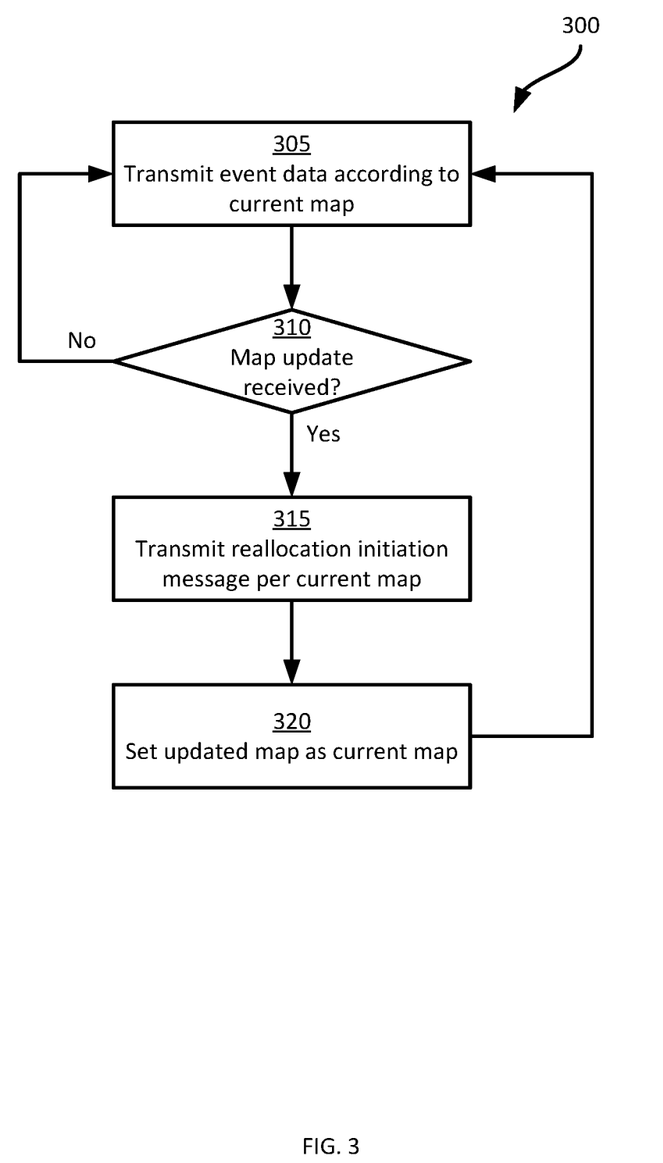
FIG. 3 is a flowchart of a method for generating event data in the system of FIG. 1.
Figure 4:
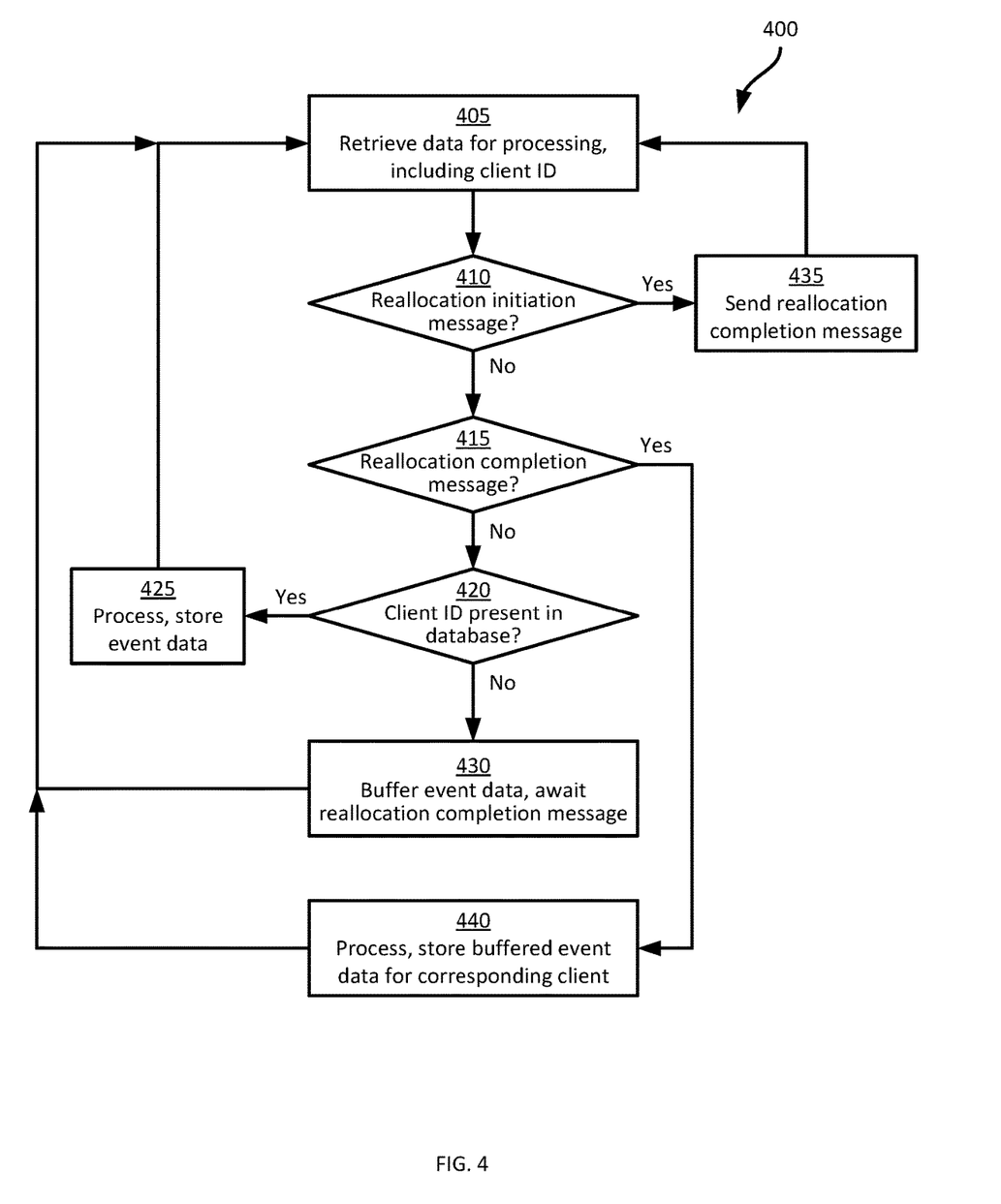
FIG. 4 is a flowchart of a method for processing event data in the system of FIG. 1.
Figure 5:
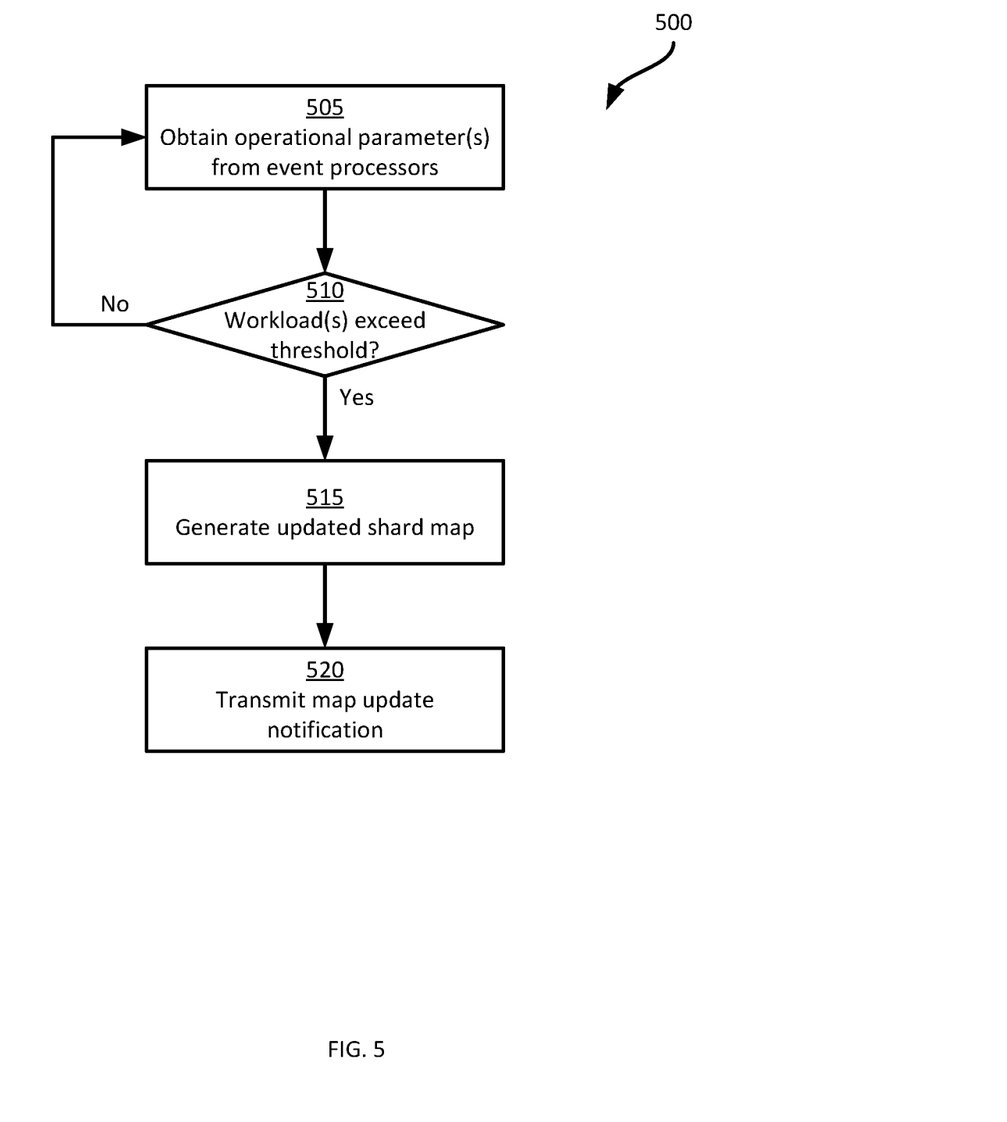
FIG. 5 is a flowchart of a method for dynamically allocating event data from the client devices among the event processors of FIG. 1.
Figure 6:
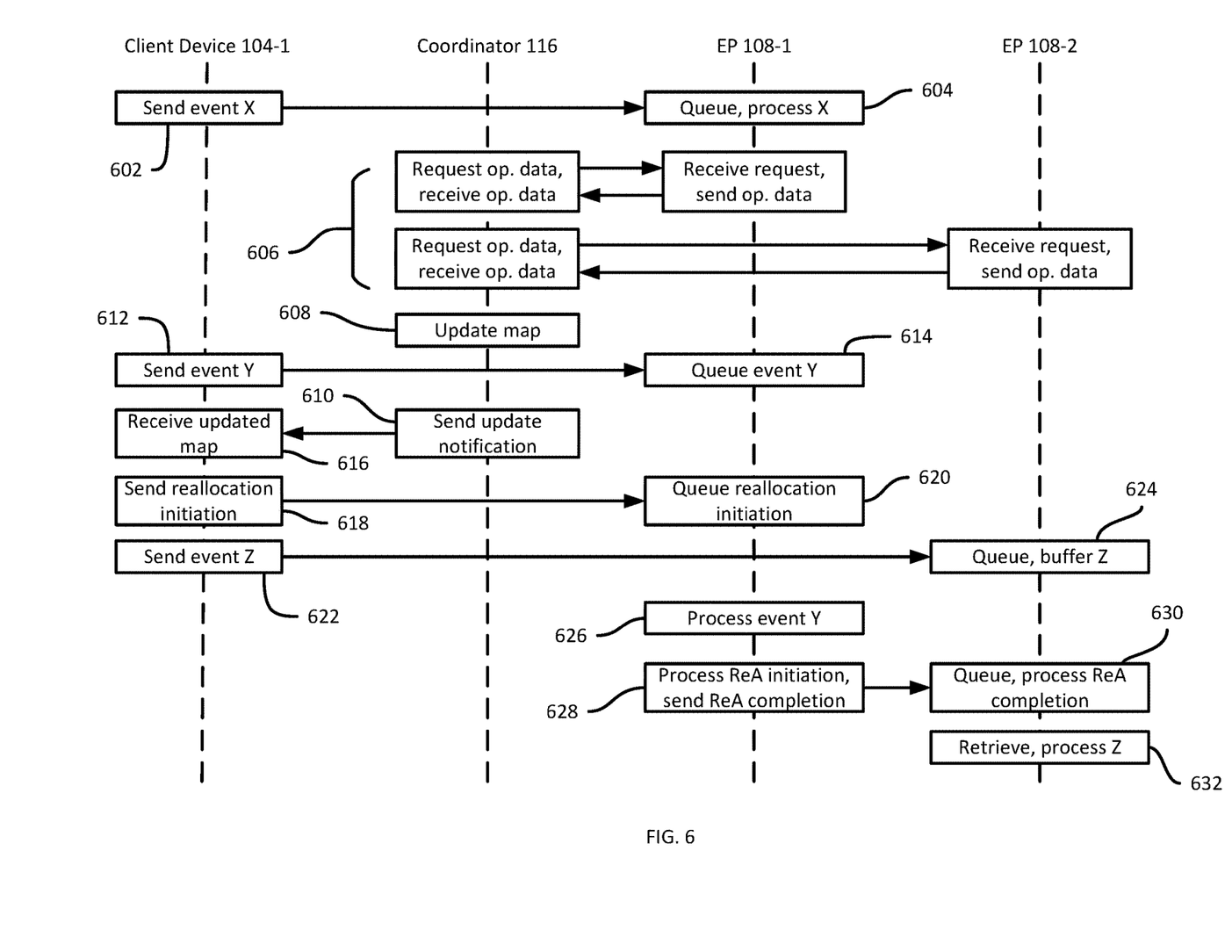
FIG. 6 is a flowchart of an example performance of the methods of FIGS. 3-5 in the system of FIG. 1.

The processing of event data generated by the client devices 104, and the reallocation of client devices 104 between event processors 108 by the coordinator 116, will now be described in greater detail with reference to FIGS. 3-6. More specifically, FIGS. 3-5 depict sequences of operations performed by the client devices 104, the event processors 108 and the coordinator 116, respectively. FIG. 6, meanwhile, depicts an example performance of the methods of FIGS. 3-5 on a single timeline, to illustrate the interactions between the components of the system 100 resulting from the methods shown in FIGS. 3-5.

Beginning at FIG. 3, a method 300 of generating event data is illustrated. The method 300 will be described in conjunction with its performance by a client device 104 via the execution of the application 208. At block 305, the client device 104 is configured to generate and transmit event data according to the map 210 as currently stored in the memory 204. The event data, as noted above, includes any of a variety of information, such as configuration changes, battery levels, and the like. The client device 104 can be configured, for example, to report a current battery level at a predetermined interval (e.g. every ten minutes). Thus, at block 305 the client device 104 is configured to generate a message containing the current battery level, and to transmit the message.

The client device 104 is configured to select a destination for the message according to the map 210. Specifically, in the present embodiment the map allocates subsets of the client devices 104 to respective databases 112. For simplicity of illustration, one event processor 108 is provided per database 112, and thus the map 210 is also referred to herein as allocating subsets of the client devices 104 to respective event processors 108.

The map 210 defines the above-mentioned allocations by specifying a key range, encompassing a subset of a total number of available keys, for each event processor 108. The keys as referred to herein are associated with unique, static identifiers of the client devices 104 (e.g. serial numbers, media access control (MAC) identifiers, and the like). More specifically, in the present example the keys are hashes of the above-mentioned client identifiers. Thus, the client device 104, at block 305, selects a destination for the message by generating a hash (according to a predetermined suitable hashing operation) of the unique identifier, and selecting the one of the event processors 108 corresponding to the key range containing the hash in the map 210. An example of the map 210 is shown below in Table 1.

TABLE 1

Example Client Shard Map 210

| Key Range | Event Processor |
|---|---|
| 1-85 | 108-1 |
| 86-171 | 108-2 |
| 172-256 | 108-3 |

As shown above, the map 210 defines three subsets of client devices 104. Specifically, the client devices 104 having client identifiers that hash to a value between 1 and 85 are allocated to the event processor 108-1, the client devices 104 having client identifiers that hash to a value between 86 and 171 are allocated to the event processor 108-2, and client devices 104 having client identifiers that hash to a value between 172 and 256 are allocated to the event processor 108-3. As will be apparent from the example above, the hashing operation employed in the present example converts each unique client identifier into a value between 1 and 256. For example, the hash may be generated as an 8-bit string (with a value between 0 and 255). In other examples, larger hash spaces may be employed (e.g. a 64-bit hash), and the hash space may also be allocated to more than three event processors 108.

Having determined a destination for the message using the map 210, the client device 104 is configured to transmit the message to the determined destination, and to proceed to block 310. The message transmitted at block 305 includes the event data itself (e.g. the above-mentioned battery level), as well as routing data for directing the message to the selected destination (e.g. network addresses or the like, which may be stored in the map 210). The message also includes the client identifier, the hash of the client identifier, or both.

In some examples, a portion of the performance of block 305 is performed by the local server 128. For example, in connection with the client devices 104-1 and 104-2, the client devices 104 themselves are configured to generate the event data, but are then configured to transmit the event data to the local server 128. The server 128 is configured to store the map 210, and to select a destination for each event received from the client devices 104-1 and 104-2 (e.g. by hashing the identifiers of the client devices 104).

At block 310, the client device 104 is configured to determine whether a map update notification has been received from the coordinator 116. When the determination is negative, the client device 104 returns to block 305 for the generation and transmission of further event data. As will now be apparent, because the client identifier employed to select a destination event processor 108 is static, each message generated at block 305 will be sent to the same event processor 108 until the map 210 changes.

Before discussing the handling of an update to the map 210 by the client device 104, a specific example performance of the method 300 by the client device 104-1 is illustrated in FIG. 6. In particular, it is assumed in this example performance that the client device 104-1 has a unique identifier that hashes to a value of 77. The client device 104-1, at block 305, therefore selects the event processor 108-1 as the destination for the message containing the current battery level of the client device 104-1. FIG. 6 illustrates, at block 602, the transmission of the message (referred to as "event X") to the event processor 108-1.

Turning now to FIG. 4, a method 400 of processing event data is illustrated. The method 400 will be described in conjunction with its performance by an event processor 108 via the execution of the application 228. As noted above, messages received at each event processor 108 are stored in the queue 229 prior to processing. At block 405, the event processor 108 is configured to retrieve data from the queue 229 for processing. In the present example, the queue 229 is operated on a first-in-first-out basis, such that data (e.g. messages containing event data) is retrieved from the queue 229 for processing in the same order that the data was received.

At blocks 410 and 415, having retrieved data from the queue 229, the event processor 108 is configured to determine whether the data is a reallocation initiation message or a reallocation completion message, respectively. The handling of reallocation initiation and completion messages at the event processors 108 will be described in greater detail below. Assuming the determinations at blocks 410 and 415 are both negative, the event processor 108 proceeds to block 420 and determines whether client identifier in the message retrieved at block 405 is present in the database 112 maintained by the event processor 108. A negative determination at block 420 indicates a reallocation, which will be discussed below in greater detail. When the determination is affirmative at block 420, the event processor 108 is configured to process and store the event data in the database 112 at block 425, and to return to block 405. The performance of block 425 can include retrieval of previously stored events for the same client device 104, for example to generate a predicted time period until the client device 104 will require a battery replacement, or the like.

Before discussing the handling of client device reallocations by the event processors, referring again to FIG. 6 a specific performance of blocks 405-425 is illustrated. As noted above, block 602 illustrates the generation and transmission of event data from the client device 104-1 to the event processor 108-1. Thus, block 604 illustrates the receipt (and storage in the queue 229) of the message at the event processor 108-1, as well as the retrieval of the message from the queue 229 and processing of the message. In other words, block 604 represents an example performance of blocks 405 and 425 (following negative determinations at blocks 410 and 415, and an affirmative determination at block 420) by the event processor 108-1.

Updating of the subsets of client devices 104 to event processors 108 will now be discussed, beginning with functionality implemented at the coordinator 116. Referring to FIG. 5, a method 500 of dynamically allocating event data from the client devices 104 among the event processors 108 is illustrated. The method 500 will be described in conjunction with its performance by the coordinator 116 via the execution of the application 248.

At block 505, the coordinator 116 is configured to obtain one or more operational parameters from each of the event processors 108. The operational parameters obtained at block 505 include any one or more of CPU utilization, queue length (e.g. number of unprocessed messages in the queue 229 of each event processor 108), a message processing rate (e.g. number of events processed from the queue 229 per second), and the like. In general, the operational parameter(s) obtained at block 505 are indicative of the current workload of each event processor 108. The operational parameters may be expressed as a fraction of a maximum capacity, or the coordinator 116 can store such maximum capacities in the memory 244.

Various mechanisms are contemplated by which the operational parameter(s) are obtained. For example, the coordinator 116 can be configured to transmit a request to each event processor 108 for the operational parameters. In other examples, the event processors 108 can be configured to automatically send the operational parameters to the coordinator 116 (i.e. without waiting for requests) at configurable time intervals.

At block 510, the coordinator 116 is configured to determine whether the workload of any one of the event processors 108, or of the event processors 108 collectively, exceeds one or more preconfigured thresholds. Various thresholds can be implemented by the coordinator 116. For example, if the operational parameter(s) obtained for any individual event processor 108 indicates a workload exceeding an upper threshold (e.g. 80% CPU utilization), the determination at block 510 is affirmative. In another example, if a difference between the lowest workload and the highest workload (e.g. the difference between a CPU utilization of 55% at the event processor 108-1 and a CPU utilization of 15% at the event processor 108-2) exceeds a threshold (e.g. 30%), the determination at block 510 is affirmative. The above-mentioned thresholds can also be combined, in some embodiments. That is, in some embodiments the determination at block 510 is affirmative when (a) at least one of the event processors 108 indicates a workload exceeding a first threshold (e.g. 80% of maximum capacity) and (b) the difference in workload between the most heavily loaded event processor 108 and the least heavily loaded event processor 108 is greater than a second threshold.

When the determination at block 510 is negative, the coordinator 116 returns to block 505. Following an affirmative determination at block 510, at block 515 the coordinator 116 is configured to generate an updated shard map allocating updated subsets of the client devices 104 to the event processors 108. In general, the map update at block 515 seeks to adjust the workloads of the event processors 108 to reduce the differences between the workloads, by changing the size of the subset of client devices 104 allocated to each event processor 108. Thus, the updated map allocates a smaller subset of client devices to an event processor 108 indicating a higher workload, and a larger subset of client devices to an event processor 108 indicating a lower workload.

Various mechanisms may be employed for adjusting the allocations of client devices 104 specified by the map 250. For example, the coordinator 116 can be configured to select the event processor 108 indicating the highest workload, and to reallocate a predetermined portion of the hash space currently allocated to that event processor 108 to the least busy event processor 108 (or to the event processor 108 adjacent to the busiest event processor 108 in the map 250). In other examples, fractions of the hash space currently allocated to each event processor 108 can be adjusted proportionally to the difference (which may be negative or positive) between the workload of each event processor and the median of all workloads. Thus, an event processor 108 with a workload that is below the median receives an increased allocation in the updated map, while an event processor 108 with a workload that is above the median receives a decreased allocation in the updated map. Table 2, below, illustrates an updated map 250 generated at block 515.

TABLE 2

Example Updated Shard Map 250

| Key Range | Event Processor |
|---|---|
| 1-71 | 108-1 |
| 72-164 | 108-2 |
| 165-256 | 108-3 |

As shown above, the subset of client devices 104 allocated to the event processor 108-1 has been reduced, and the remaining client devices 104 (more specifically, the remainder of the key space) has been evenly divided between the event processors 108-2 and 108-3. Thus, the event processors 108-2 and 108-3 are now allocated larger subsets of the key space than the event processor 108-1.

At block 520, the coordinator 116 is configured to transmit a map update notification for the client devices 104. The notification may be transmitted directly to each individual client device 104 (e.g. in the case of the client devices 104-3, 104-4 and 104-5), or to an intermediate device, such as the local server 128.

Returning to FIG. 6, continuing the specific example performance of the methods 300, 400 and 500, a set 606 of blocks illustrates the request and receipt of operational parameters from the event processors 108-1 and 108-2 by the coordinator 116. Further, block 608 illustrates the updating of the map 250 to the map shown above in Table 2, following an affirmative determination at block 515. Further, block 610 illustrates the transmission of the map update notification to the client device 104-1. As will be apparent, however, other events precede the transmission of the notification at block 610 and its receipt at the client device 104-1.

Returning to FIG. 3, the handling of the updated map 250 by the client devices 104 and the reallocation of client devices 104 between event processors 108 will be discussed in greater detail.

In a further performance of the method 300, at block 305 the client device 104 is configured to transmit event data to an event processor 108. Thus, continuing the specific example shown in FIG. 6, the client device 104-1 is shown transmitting a further event ("event Y") to the event processor 108-1 at block 612. The client device 104-1 has not yet received the map update notification sent at block 610, and therefore the event Y is transmitted using the current map maintained in the memory 204, which is as shown in Table 1. The event Y is queued at the event processor 108-1, but not yet processed (e.g. because other data remains to be processed from the queue 229 before the event Y is processed). Following transmission of the event Y by the client device 104-1, the coordinator 116 sends the previously mentioned update notification, which is received at block 616 at the client device 104-1.

Referring again to FIG. 3, at block 310, receipt of the updated map 250 results in an affirmative determination at block 310. Specifically, an affirmative determination at block 310 is a determination that the updated map affects the allocation of the receiving client device 104-1. In other words, each client device 104 may receive the updated map from the coordinator 116, but the updated map may allocate some client devices 104 to the same event processors 108 as the previous map. Those client devices 104 make negative determinations at block 310.

Following an affirmative determination at block 310, the client device 104 proceeds to block 315, at which the client device 104 transmits a reallocation initiation message according to the current map 210 (i.e. before the updates received at block 310 are applied).

Thus, referring again to FIG. 6, in the present example the client device 104-1 sends a reallocation initiation message to the event processor 108-1 at block 618, and the message is queued at the event processor 108-1 at block 620. The reallocation initiation message includes the client identifier and/or the above-mentioned hash of the client identifier, as well as an identifier of the event processor 108 to which the client device 104-1 is allocated in the updated map. In the present example, as shown in Table 2, the client device 104-1 is allocated to the event processor 108-2 in the updated map.

Returning to FIG. 3, following transmission of the reallocation initiation message, the client device 104 is configured to set the updated map as the current map, and to then return to block 305 for the generation and transmission of further event data according to the updated map. Thus, future events generated by the client device 104-1 in the example of FIG. 6 are sent to the event processor 108-2, rather than the event processor 108-1. An example of such a future event is shown as the event Z, which is sent (via a further performance of block 305 at the client device 104-1) at block 622. Of note is that in the example of FIG. 6, the event Y has not yet been processed by the event processor 108-1, and therefore the reallocation initiation message has also not yet been processed.

The event processors 108 are configured to detect reallocated client devices 104, and to perform certain additional actions to mitigate the potential for out-of-order processing of events from a given client device 104 during reallocation (e.g. of the events Y and Z). Specifically, referring to FIG. 4, responsive to the retrieval of a message containing event data for processing at block 405, the determinations at blocks 410 and 415 are negative. When the event data is from a client device 104 whose identifier (or hash thereof) is not present in the database 112, the determination at block 420 is negative, indicating that the event data retrieved at block 405 is the first instance of event data from the corresponding client device 104. In other words, a negative determination at block 420 indicates that the client device 104 has been reallocated to the event processor 108 from another event processor 108, and that the other event processor 108 may therefore still have unprocessed event data from the client device 104.

The event processor 108 therefore proceeds to block 430, and stores the event data in the buffer 230, for later processing, before returning to block 405 to retrieve further data from the queue 229. That is, the event processor 108 retrieves the event data from the queue 229, but does not fully process the event data, and instead moves on to the remainder of the queue 229. The messages in the queue 229 are therefore may not be processed in exactly the order received, but messages from each source of events (i.e. each client device 104) remain in order. Any further events received from the newly reallocated client device 104 are also placed in the buffer 230, until a reallocation completion message is received.

Referring again to the specific example of FIG. 6, the above-mentioned buffering of an event from a newly reallocated client device 104 is illustrated at block 624, at which the event processor 108-2 receives the event Z, and upon reaching the event Z in the queue 229, stores the event Z in the buffer 230 rather than processing the event Z. Meanwhile, the event processor 108-1 continues to retrieve and process messages from its queue 229. As will be apparent from FIG. 6, the event Y is retrieved and processed at block 626 (via a further performance of block 405 and 425, via negative determinations at blocks 410 and 415 and an affirmative determination at block 420). After the processing of event Y, the event processor 108-1 retrieves and processes the reallocation initiation message received from the client device 104-1, as shown at block 628. The processing of reallocation initiation messages by the event processors 108 will be described in greater detail in connection with FIG. 4.

As noted above, having retrieved a message from the queue 229 for processing, the event processor 108 is configured to determine at block 410 whether the message is a reallocation initiation message. When the determination is affirmative at block 410, the event processor 108 is configured to proceed to block 435. At block 435, the event processor 108 is configured to send a reallocation completion message. Specifically, the reallocation completion message is sent to the event processor 108 to which the client device from which the reallocation initiation message has been reallocated. The reallocation initiation message itself, as mentioned earlier, contains an identifier of the event processor 108 to which the sending client device 104 is now allocated. The reallocation completion message is therefore sent to the event processor 108 so identified in the reallocation initiation message. The reallocation completion message also contains the client identifier and/or client identifier hash contained in the reallocation initiation message.

As will now be apparent to those skilled in the art, the reallocation initiation message indicates the point at which the sending client device 104 ceased sending event data to the initial event processor 108 and begun sending event data to its newly allocated event processor 108. Thus, the retrieval, by the initial event processor 108, of a reallocation initiation message from the queue 229 indicates that no further events from the sending client device 104 remain in the queue 229.

The transmission of a reallocation completion message by the event processor 108-1 to the event processor 108-2 is shown in FIG. 6 at block 628. At block 630, the reallocation completion message is retrieved for processing from the queue 229. Returning to FIG. 4, retrieval of the reallocation completion message at block 405 results in an affirmative determination at block 415. The performance of method 400 at the event generator 108-2 therefore proceeds to block 440, at which any event data previously stored in the buffer 230 in association with the client identifier in the reallocation completion message is retrieved for processing. An example performance of block 440 is illustrated in FIG. 6, in which the event Z previously buffered is retrieved and processed at block 632.

Thus, via the performances of the methods 300, 400 and 500, the client devices 104, the event processors 108 and the coordinator 116, respectively, are configured to reallocate event data from certain client devices 104 between event processors 108 responsive to changes in workload at the event processors 108, while mitigating the potential for out-of-order processing of event data from any individual client device 104.

Variations to the above are contemplated. For example, in some embodiments the client devices 104, or the server 128 (when present) performs the buffering and release of events discussed above in connection with blocks 430 and 440. In such embodiments, responsive to sending the reallocation initiation message at block 315, the client device 104 is configured to buffer further event data messages generated at block 305. The event processor 108, meanwhile, upon retrieval of the reallocation initiation message at block 410, does not transmit the reallocation completion message to another event generator 108 as described above, but instead transmits the reallocation completion message to the client device 104. The client device 104 then transmits any buffered events to the new event processor 108. The new event generator 108, on receiving the events, need not perform block 430 or 440, but can instead simply process the events as they are retrieved from the queue 229.

In further variations, the map may be retrieved periodically from the coordinator 116 by the client devices 104, instead of being proactively transmitted to the client devices 104 by the coordinator 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamically allocating event data from a plurality of client devices among a set of event processors, the method comprising:
   at a partitioning controller, storing an initial shard map allocating initial subsets of the client devices to respective data stores, each data store associated with a respective one of the event processors;
   at the partitioning controller, obtaining an operational parameter for each of the event processors;
   at the partitioning controller, generating an updated shard map based on the operational parameter for each of the event processors, the updated map allocating updated subsets of the client devices to the respective data stores;
   responsive to generating the updated shard map, transmitting a map update notification from the partitioning controller for the client devices;
   receiving, at a first one of the event processors, a reallocation initiation message from a reallocated one of the client devices; and
   when no event data from the reallocated client device remains to be processed at the first event processor, sending a reallocation completion message to a second event processor.

2. The method of claim 1, wherein the initial shard map defines a plurality of client identifier ranges, and an identifier of a respective event processor corresponding to each client identifier range.

3. The method of claim 1, wherein obtaining an operational parameter for each of the event processors comprises:
transmitting an operational parameter request to each event processor; and
receiving respective operational parameters from each event processor.

4. The method of claim 1, wherein each operational parameter indicates a workload at the corresponding event processor.

5. The method of claim 4, wherein each operational parameter includes at least one of central processing unit (CPU) utilization, a message processing rate, and a message queue length.

6. The method of claim 4, wherein generating the updated shard map comprises determining whether the workloads exceed a predetermined threshold.

7. The method of claim 6, wherein determining whether the workloads exceed a predetermined threshold comprises:
determining whether any of the workloads exceed a first threshold; and
determining whether a difference between a maximum one of the workloads and a minimum one of the workloads exceeds a second threshold.

8. The method of claim 1, further comprising:
prior to receiving the reallocation completion message at the second event processor, receiving further event data from the reallocated client device; and
storing the further event data in a buffer pending receipt of the reallocation completion message.

9. A system comprising:
a plurality of client devices generating event data;
a plurality of event processors, each event processor configured to process the event data from an allocated one or more of the plurality of client devices, the plurality of event processors including a first one of the event processors and a second one of the event processors, the first event processor configured to:
receive a reallocation initiation message from a reallocated one of the plurality of client devices; and
when no event data from the reallocated client device remains to be processed at the first event processor, send a reallocation completion message to a second event processor; and
a partitioning controller including (i) a communications interface, (ii) a memory storing an initial shard map allocating initial subsets of the plurality of client devices to respective data stores, each data store associated with a respective one of the plurality of event processors, and (iii) a processor connected with the communications interface and the memory, the processor configured to:
obtain an operational parameter for each of the plurality of event processors;
generate an updated shard map based on the operational parameter for each of the plurality of event processors, the updated map allocating updated subsets of the plurality of client devices to the respective data stores; and
responsive to generating the updated shard map, transmit a map update notification for the plurality of client devices via the communications interface.

10. The system of claim 9, wherein the initial shard map defines a plurality of client identifier ranges, and an identifier of a respective event processor corresponding to each client identifier range.

11. The system of claim 9 wherein, to obtain an operational parameter for each of the plurality of event processors, the processor is further configured to:
transmit an operational parameter request to each event processor via the communications interface; and
receive, via the communications interface, respective operational parameters from each event processor.

12. The system of claim 9, wherein each operational parameter indicates a workload at the corresponding event processor.

13. The system of claim 12, wherein each operational parameter includes at least one of central processing unit (CPU) utilization, a message processing rate, and a message queue length.

14. The system of claim 12, wherein generating the updated shard map comprises determining whether the workloads exceed a predetermined threshold.

15. The system of claim 14 wherein, to determine whether the workloads exceed a predetermined threshold, the processor is further configured to:
determine whether any of the workloads exceed a first threshold; and
determine whether a difference between a maximum one of the workloads and a minimum one of the workloads exceeds a second threshold.

16. The system of claim 9, wherein the second event processor is configured to:
prior to receiving the reallocation completion message from the first event processor, receive further event data from the reallocated client device; and
store the further event data in a buffer at the second event processor pending receipt of the reallocation completion message.

* * * * *